(12) United States Patent
Snell

(10) Patent No.: US 6,886,793 B2
(45) Date of Patent: May 3, 2005

(54) SUCTION CUP ASSEMBLY WITH MAGNETIC TETHER

(75) Inventor: Russell Benton Snell, Bentleyville, OH (US)

(73) Assignee: InterDesign, Inc., Solon, OH (US)

(*) Notice: Subject to any disclaimer, the term of this patent is extended or adjusted under 35 U.S.C. 154(b) by 37 days.

(21) Appl. No.: 10/225,055

(22) Filed: Aug. 21, 2002

(65) Prior Publication Data

US 2004/0035997 A1 Feb. 26, 2004

(51) Int. Cl.[7] ................................................. A47F 5/00
(52) U.S. Cl. ................................................. 248/309.1
(58) Field of Search ........................ 248/206.5, 205.6, 248/309.1, 683, 690, 691, 205.5, 206.2, 301, 304, 305, 306, 206.6; 24/303

(56) References Cited

U.S. PATENT DOCUMENTS

| 253,392 | A | * | 2/1882 | Middleton | ............... 248/205.5 |
| 1,230,242 | A | | 6/1917 | Von Unruh | |
| 1,575,789 | A | * | 3/1926 | Phelps | ................... 248/205.5 |
| 2,505,899 | A | * | 5/1950 | Jobe | ......................... 248/205.7 |
| 4,279,396 | A | * | 7/1981 | Bendock | .................. 248/205.5 |
| 4,428,033 | A | * | 1/1984 | McBride | .................... 362/183 |
| 4,848,713 | A | * | 7/1989 | Adams | .................... 248/206.2 |
| D311,933 | S | * | 11/1990 | Adams | ........................ D20/43 |
| 4,991,806 | A | * | 2/1991 | Nakamura et al. | ....... 248/206.2 |
| D332,390 | S | | 1/1993 | Adams | |
| 5,208,951 | A | * | 5/1993 | Aoki | ............................ 24/303 |
| 5,356,102 | A | * | 10/1994 | Blumenaus | .............. 248/205.5 |
| 5,595,364 | A | * | 1/1997 | Protz, Jr. | .................. 248/205.5 |
| 6,015,173 | A | * | 1/2000 | Shang | ........................ 292/288 |
| D421,383 | S | * | 3/2000 | Walker et al. | ............... D8/373 |
| 6,131,865 | A | * | 10/2000 | Adams | .................... 248/206.2 |

FOREIGN PATENT DOCUMENTS

CH        686 058 A5 * 12/1995

* cited by examiner

Primary Examiner—Leslie A. Braun
Assistant Examiner—Kofi Schulterbrandt
(74) Attorney, Agent, or Firm—D. Peter Hochberg; Sean Mellino; Katherine R. Vieyra

(57) ABSTRACT

The present invention provides a suction cup assembly having a magnetic tether system attached to a suction cup. The assembly includes a resilient suction cup, tether, holder and magnet. This assembly enables a suction cup to hold items on non-magnetic, smooth surfaces using a magnet.

13 Claims, 5 Drawing Sheets

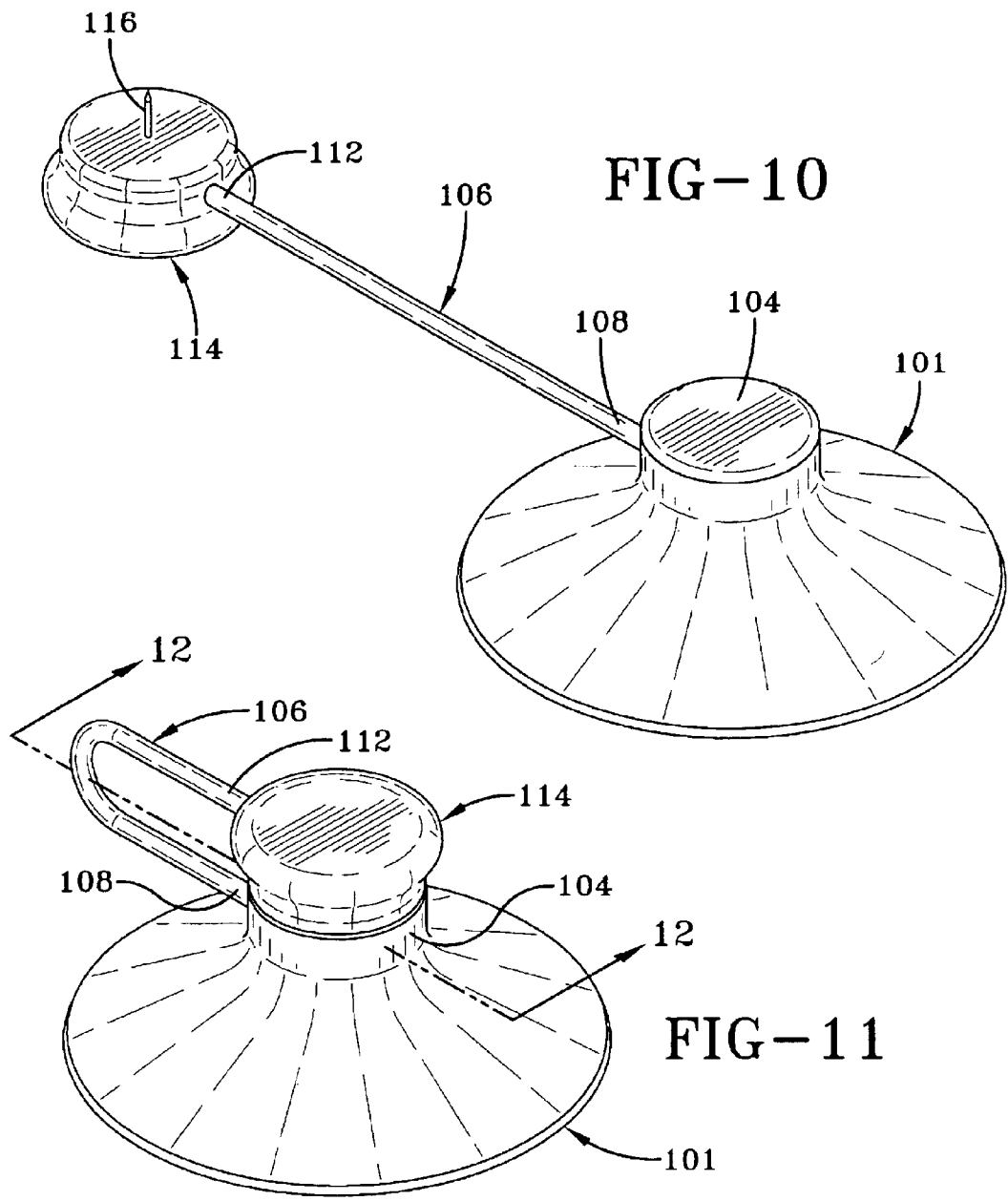
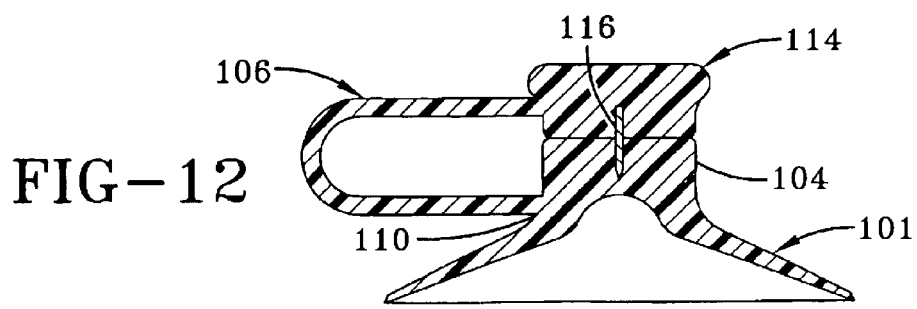

US 6,886,793 B2

SUCTION CUP ASSEMBLY WITH MAGNETIC TETHER

BACKGROUND OF THE INVENTION

1. Field of the Invention

This invention relates to a suction cup assembly having a suction cup and holding device, and it more particularly relates to a suction cup assembly having a suction cup with a neck and a holding device which is removably attachable to the neck, the suction cup and the holding device each having one of a magnet and a magnetic metal for attaching them together to hold an article between them. The assembly can include a tether for attaching the holder to the suction cup or the magnet can be replaced with a sharp pin such as a thumbtack in which case the magnetic metal can be eliminated.

2. Description of the Prior Art

There is a need in offices, schools and homes to hold and perhaps display pieces of paper, photographs, notes and other small, flat items. Often, tapes or other adhesives can be used to attach items to surfaces. Instead of adhesives, there are fixtures which can be used to hold and display these items. For example, a smaller wire fixture such as is shown in U.S. Pat. No. 1,230,242, can be used to hold sheets of paper and similar items. One embodiment of this fixture attaches to a button or knob but the fixture could be attached to a suction cup. Another method of hanging or holding small items such as papers, notices, pictures, recipes, flyers and the like, without requiring a hole in the small item, is with magnets. Clips attached to magnets or suction cups are also available for this purpose.

A problem with using adhesives to attach items to various smooth surfaces is that the adhesives often damage both the item being held and the surface to which the item adheres. A problem with wire fixtures which hold papers and the like is that each paper must have a hole from which it can be hung from the fixture. A separate problem with magnets as devices to attach items to flat surfaces is that the surface must be a magnetic metal to which a magnet could adhere. Clips themselves may be the cause of damage if the strength of the grip exceeds the toughness of the surface of the article or articles held in the clips.

SUMMARY OF THE INVENTION

It is an object of the present invention to provide an assembly for holding paper and other items which combines a suction cup and a holding device, with means to detachably join the suction cup and the holding device.

It is another object of the present invention to provide an assembly for holding paper and other items which combines a suction cup and a holding device, one of which having a magnetic cap and the other having a magnet.

It is an another object of the present invention to provide an assembly which combines a suction cup with a magnet on a tether or a suction cup with a tether having a pin.

Another object of the present invention is to provide an assembly combining a resilient suction cup having a magnetic metal cap with a separable resilient tether having a magnet.

Another object of the present invention is to provide an assembly combining a resilient suction cup having a magnet for its cap with a separable resilient tether with a magnetic metal end.

Still another object of the present invention is to provide an assembly that can be used like a magnet on non-magnetic and non-metallic surfaces, such as glass, wood, plastic or stainless steel.

Still another object of the present invention is to provide an assembly that can be used like a thumbtack on non-porous surfaces, such as glass, wood, plastic or stainless steel.

Still another object of the present invention is to provide an assembly combining a resilient suction cup, and a tether with a holder containing either a magnet or magnetic material, or a pin, such that the assembly is inexpensive to manufacture, easy and economical to produce and assemble and attractive in appearance.

Yet another object of the present invention is to provide an assembly combining a suction cup and a tether with a holder containing either a magnet or a magnetic material, or a pin, such that the resulting assembly is sturdy.

Other objects will be apparent from the description to follow and from the appended claims.

The foregoing objects are achieved according to a preferred embodiment of the invention by means of a resilient suction cup having a tether attached on one end to the neck of the suction cup and having a magnet on its unattached end. The neck of the suction cup is capped with a magnetic metal cover, enabling the magnet to adhere to the suction cup and hold papers or other items placed between the magnetic metal and the magnet. In the alternative, the neck of the suction cup is capped with a magnet and the tether has a magnetic metal end, enabling the end of the tether to adhere to the suction cup and hold papers or other items placed between the magnetic metal and the magnet. The tether is preferably formed with the suction cup and is integral therewith.

BRIEF DESCRIPTION OF THE DRAWINGS

FIG. 10 is a perspective view of a second preferred embodiment of the suction cup assembly with tether disengaged.

FIG. 11 is a perspective view of a second preferred embodiment of the suction cup assembly with tether engaged.

FIG. 12 is a view through section 12—12 in FIG. 11.

DESCRIPTION OF THE PREFERRED EMBODIMENTS

Figure 1:
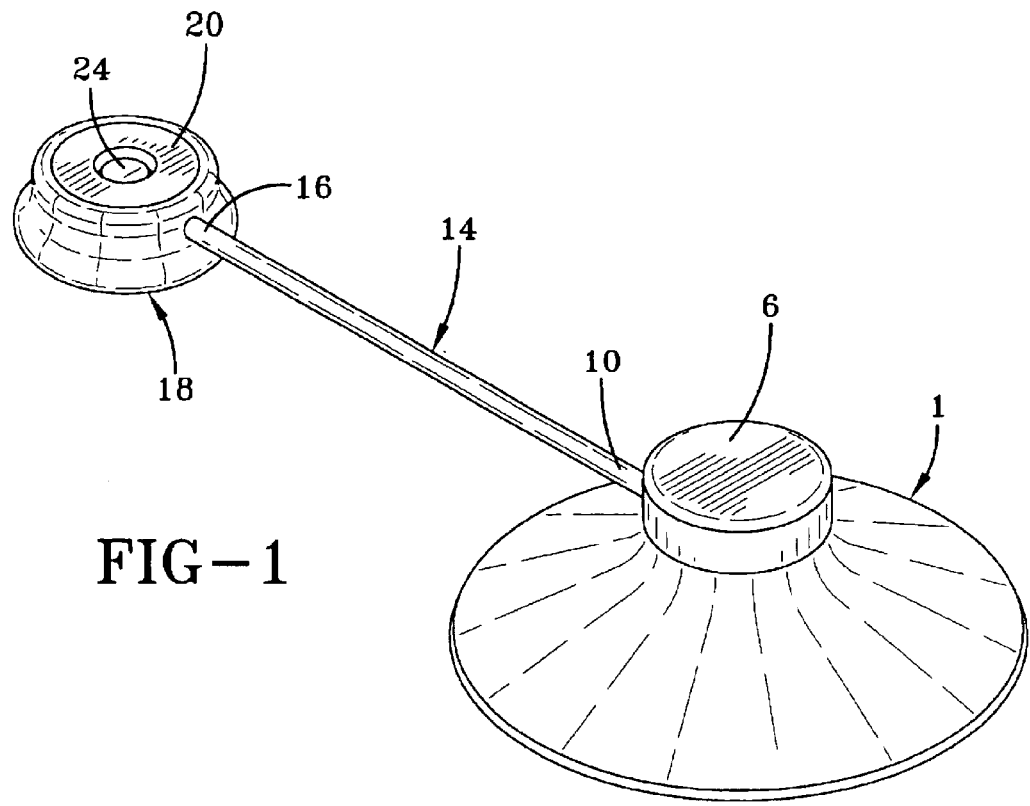
FIG. 1 is a perspective view of the suction cup assembly with magnet disengaged.
Figure 2:
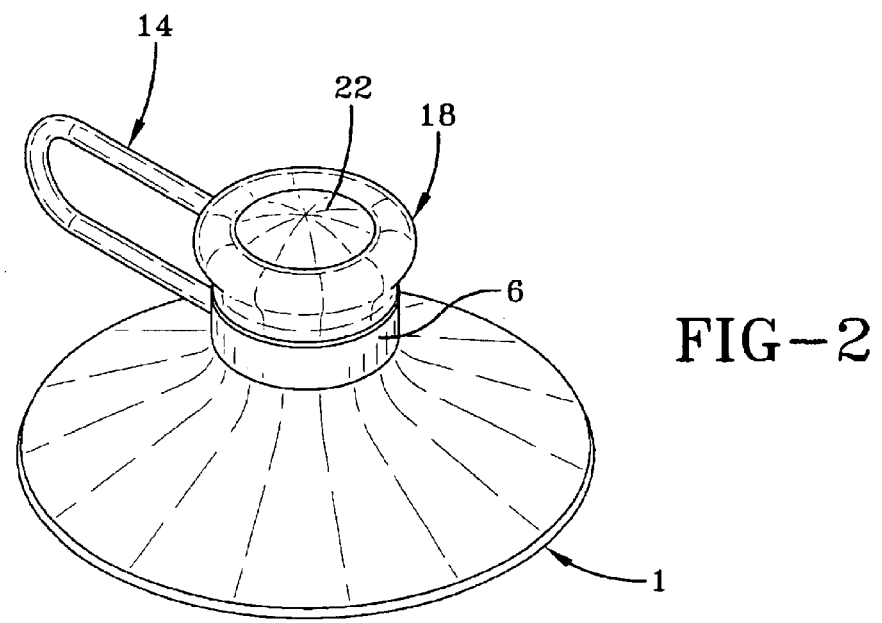
FIG. 2 is a perspective view of the suction cup assembly with magnet engaged.
Figure 3:
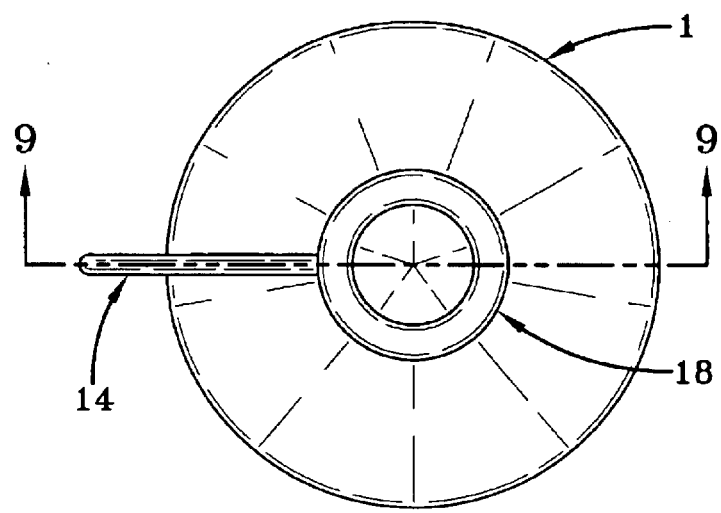
FIG. 3 is a top view of the suction cup assembly with magnet engaged.
Figure 4:
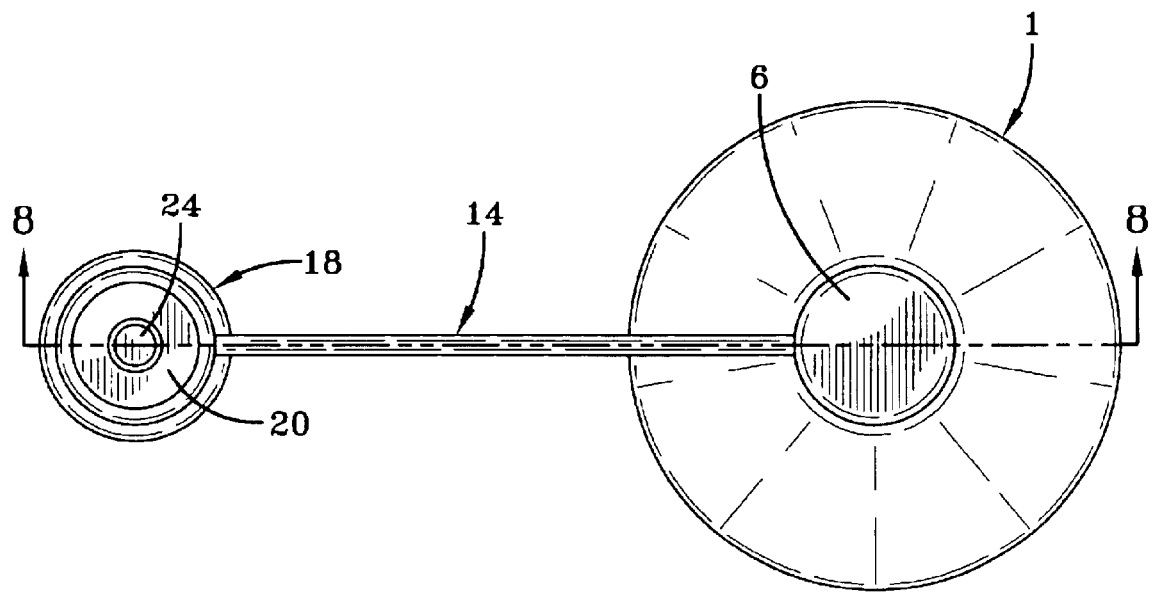
FIG. 4 is a top view of the suction cup assembly with magnet dis-engaged.
Figure 5:
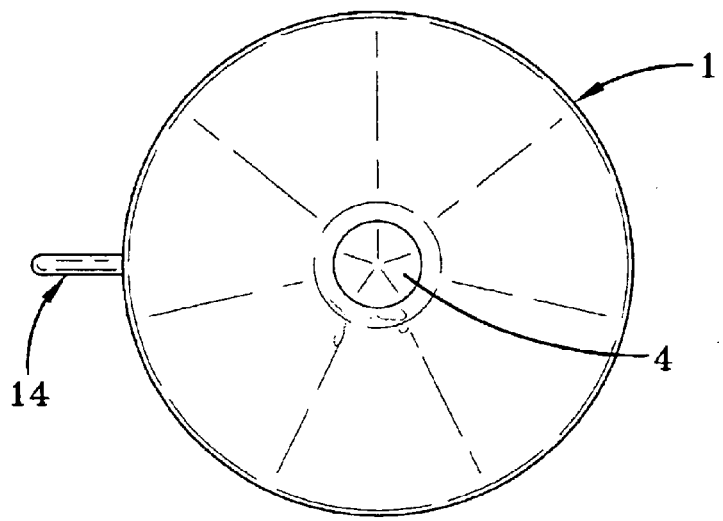
FIG. 5 is a bottom view of the suction cup assembly with magnet engaged.
Figure 6:
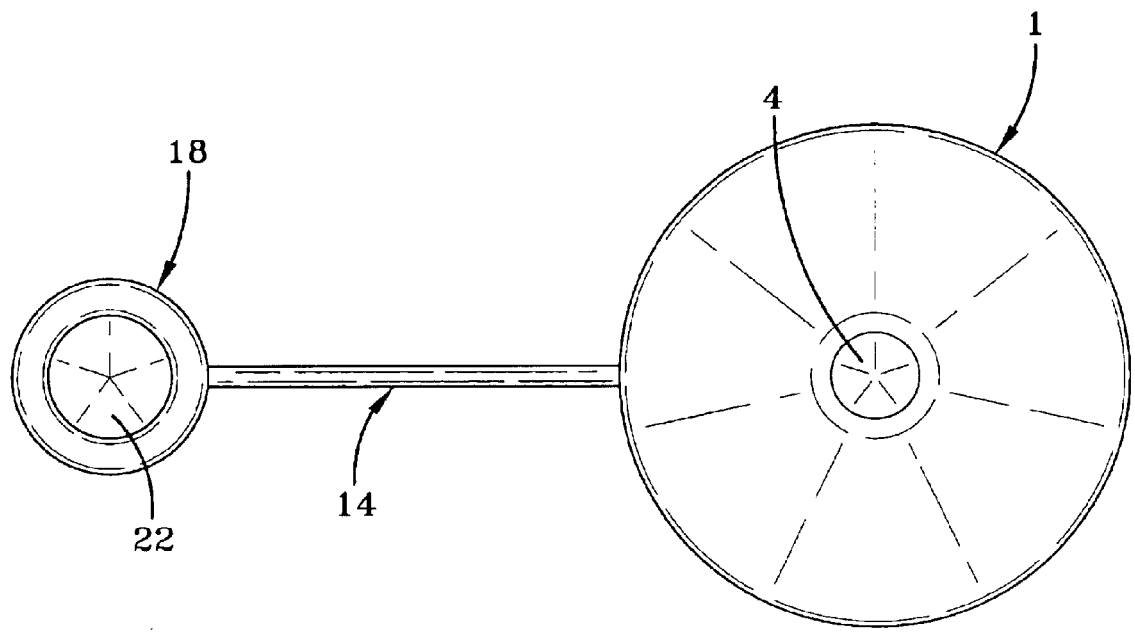
FIG. 6 is a bottom view of the suction cup assembly with magnet dis-engaged.
Figure 7:
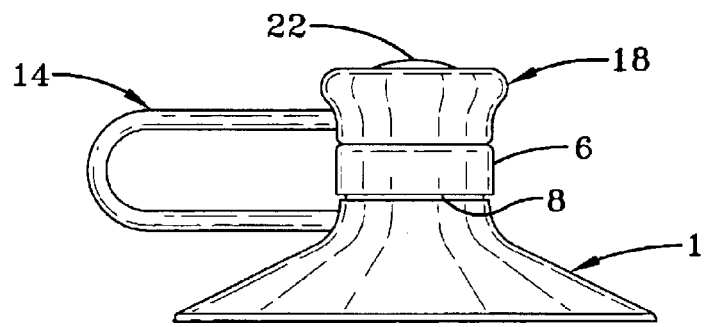
FIG. 7 is a side view of the suction cup assembly with magnet engaged.
Figure 8:
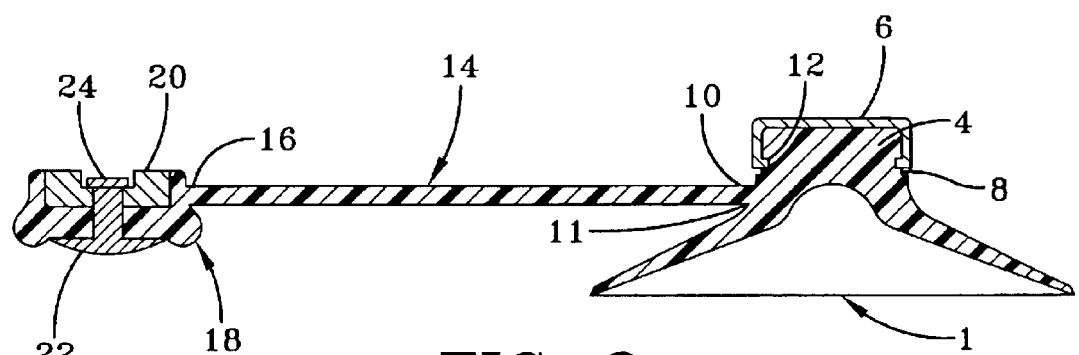
FIG. 8 is a section taken along line 8—8 in FIG. 4 of the suction cup assembly with magnet dis-engaged.
Figure 9:
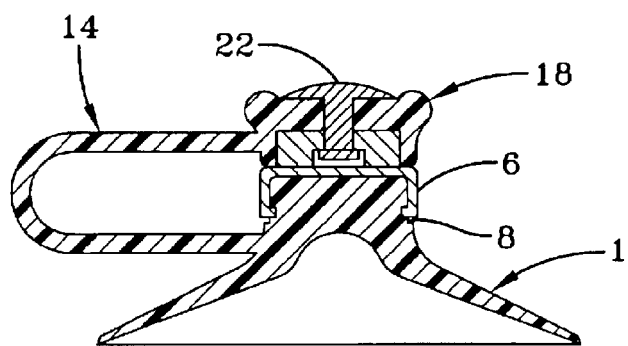
FIG. 9 is a section taken along line 9—9 in FIG. 3 of the suction cup assembly with magnet engaged.

The preferred embodiments of the invention described below comprise a suction cup assembly with magnetic tether system as shown in the drawings, FIGS. 1–9, comprising a suction cup 1 having a neck or nub 4 which can be covered by a magnetic cap 6 to which a magnet can adhere. The magnetic cap 6 can be made of a material, such as iron or steel, to which a magnet is attracted and will adhere. In a preferred embodiment, the neck 4 is cylindrical with an indentation 8 near the junction 11 with the suction cup 1 and the cap 6 is a magnetic metal. The cap 6 can have crimped edges 12, enabling it to grasp the neck 4 of the suction cup in the indentation 8. A tether 14 can be attached, either permanently fixed or detachable, at one end 10 to the suction cup 1 at the junction 11, or preferably molded with the suction cup and integral with it. The other end 16 of the tether 14 is attached holder 18 which contains a magnet 20. In a preferred embodiment, the magnet 20. In a preferred embodiment, the magnet 20 is riveted with rivet 22 and rivet cap 24 into the holder 18. The suction cup, tether and holder can each be made of a resilient material such as rubber or rubber alloy or plastic, which could be elastometric plastic, or PVC.

A second preferred embodiment described below comprises a suction cup assembly with a tether system as shown in the drawings, FIGS. 10–12, comprising a suction cup 101 having a neck or nub 104. A tether 106 can be separably attached at one end 108 to the suction cup 101 at the junction 110, or preferably molded with the suction cup and integral with it. The other end 112 of the tether 106 is attached to a holder 114 which contains a pin 116 protruding from the holder. The pin 116 can be engaged by or inserted into the neck 104 of the suction cup 101 or into a receiving piece (not shown), if desired.

In a preferred embodiment, the tether is between 2½ and 3 inches long and the cap is a circle which is 0.63 inches in diameter and 0.19 inches thick. In another preferred embodiment, the magnet is a cylinder whose diameter is 0.49 inches. In yet another preferred embodiment, the neck of the suction cup is a cylinder whose radius is 0.19 inches. However, the size can vary according to the use to which the suction cup is to have, and the area in which it is to be employed.

Although the cap and the magnet can be attached to the suction cup and holder as described above, they can be attached to the supporting structure in other ways as well. For example, either or both of them could be molded when the suction cup or tether are molded in an injection molding machine. In another embodiment, the sprue created during the injection molding process could serve as tether, linking the suction cup and the holder.

The invention can be used like a magnet on non-magnetic and non-metallic surfaces, such as glass, mirrors, wood, plastic or stainless steel. To use this invention, one suctions the suction cup onto a glass, stainless steel or other surface, places notes, pictures, flyers or other items onto the metal cap of the suction cup and then places the holder onto the items to engage the magnet and hold the items in place. The tether holds the magnet to the suction cup and prevents the magnet from becoming lost when not engaged. The invention is especially useful for hanging and displaying pictures, notes, flyers, and other items in lockers, kitchens and work areas. To use a second embodiment of this invention, one suctions the suction cup onto a surface, places notes, flyers or other items onto the neck of the suction cup and then pushes the pin contained in and protruding from the holder through the items and into the neck of the suction cup to secure the items.

The invention is particularly advantageous when formed of resilient materials such as plastic, rubber or rubber alloy but would apply to other materials as well. The invention could be virtually any size suction cup, tether and magnet or pin. The suction cup, tether and magnetic or non-magnetic holder can be integral, and can be molded in one molding operation; the magnet and the cap, or pin (in lieu of magnet and cap), could be inserted as well during the molding process, making the manufacturing process inexpensive, as opposed particularly to manual assembly. Variations in the foregoing description fall within the invention.

The invention has been described in detail with particular emphasis being placed on the preferred embodiments thereof, but variations and modifications within the spirit and scope of the invention may occur to those skilled in the art to which the invention pertains.

I claim:

1. A device for attaching items to a flat surface, said device comprising:

a suction cup having a solid neck having one of a magnet or a magnetic cap covering said neck top and side surfaces, said cap having a continuous planar top having no voids or holes in said planner top; and a holder having the other of the magnet and the magnetic cap, said holder being fastened to said suction cup by a tether and said holder being movable with respect to said neck for magnetically holding items between said magnet and said cap.

2. A device according to claim 1, wherein said holder, said suction cup, and said tether are all made of flexible plastic and are integrally molded together.

3. A device according to claim 1, wherein the suction cup, tether and holder are made of a material selected from the group consisting of PVC, elastometric plastic, rubber alloy and rubber.

4. A device according to claim 1, wherein said cap is metallic material.

5. A device according to claim 1, wherein said cap is steel.

6. A device according to claim 1, wherein said magnet is riveted to one of said neck or said holder.

7. A device for attaching items to a flat surface, said device comprising:

a suction cup having a solid neck topped by a cap, said cap having a continuous planar top having no voids or holes in said planar top;

a holder containing a magnet adapted to be magnetically attracted to said cap; and a tether arrangement for detachably fastening said holder to said suction cup.

8. A device according to claim 7, wherein said cap has crimped edges for securing said cap to said neck.

9. A device for attaching non-perforated items to a flat surface, said device comprising:

a cylindrical holder containing a magnet;

a suction cup including a compressible cup and a cylindrical neck having a top and sides covered by a magnetic cap, said cap having a continuous planar top having no voids or holes in said planar top, and said can having crimped edges for grasping said neck, said suction cup having a junction between said compressible cup and said neck; and a tether arrangement integral with said holder and suction cup, said tether arrangement fastening said holder to said suction cup, wherein said tether arrangement has opposing ends, one of said opposing ends being secured to said suction cup at the junction and the other of said opposing ends being secured to said holder.

10. A suction cup assembly comprising:

a resilient suction cup having a compressible cup and an integral neck located on said cup, said neck having a free end portion;

a magnetic cap fixedly secured to the free end portion of said neck, said cap having a continuous planar top having no voids or holes in said planar top;

a flexible tether integral with said suction cup and extending from said suction cup;

a holder integral with said tether; and a magnetic piece fixedly secured to said holder, one of said magnetic cap and said magnetic piece being a magnet, said neck with said magnetic cap being able to secure items between said magnetic cap and said magnetic piece in said holder.

11. A suction cup assembly according to claim 10, wherein said magnetic cap has a rim extending around said neck, and said cap is crimped into said neck to secure said cap fixedly on said neck.

12. A suction cup assembly according to claim 10, wherein said magnetic piece is riveted to said bolder to fixedly secure said magnetic piece to said bolder.

13. A suction cup assembly according to claim 10, wherein said neck has a solid surface.

* * * * *